United States Patent [19]

Davis

[11] Patent Number: 5,621,490

[45] Date of Patent: Apr. 15, 1997

[54] SOUND SYSTEM FOR COMPACT DISTRIBUTION PRINT

[75] Inventor: Clay Davis, Redondo Beach, Calif.

[73] Assignee: The Todd-AO Corporation, Hollywood, Calif.

[21] Appl. No.: 697,606

[22] Filed: Aug. 26, 1996

[51] Int. Cl.[6] .............................. G03B 31/00; G03B 41/00
[52] U.S. Cl. ................................... 352/79; 352/80; 352/5
[58] Field of Search .................................. 352/5, 27–29, 352/79, 80; 369/120, 124, 125; 381/29, 30, 33

[56] References Cited

U.S. PATENT DOCUMENTS

| | | |
|---|---|---|
| 3,682,540 | 8/1972 | Oxberry et al. . |
| 3,865,738 | 2/1975 | Lente . |
| 4,085,296 | 4/1978 | Keegan . |
| 4,124,784 | 11/1978 | Johnson et al. . |
| 4,355,383 | 10/1982 | Dolby . |
| 4,577,231 | 3/1986 | Allen . |
| 4,900,293 | 2/1990 | McLendon ........................... 352/241 |
| 5,231,627 | 7/1993 | Paul et al. . |
| 5,479,223 | 12/1995 | McLendon et al. ........................ 352/79 |
| 5,534,954 | 7/1996 | Vetter ........................................ 352/79 |

*Primary Examiner*—Safet Metjahic
*Assistant Examiner*—Michael Dalakis
*Attorney, Agent, or Firm*—Freilich Hornbaker Rosen

[57] ABSTRACT

A system is provided for treating sound represented by the varying width of a motion picture film soundtrack, which provides a "flat" frequency response up to 12.5 kHz with maximum phase coherence, even though the film speed is only 62% to 78% of the present speed of 90 feet per minute. The projector photocell which detects a slit-shaped area of light passing through the soundtrack, produces an output that is amplified so the amplification is progressively greater at higher frequencies, with the gain at 12.5 kHz being at least 6 dB greater than at 1 kHz. A photocell is selected whose output at 12.5 kHz is within 1 dB of its output at 1 kHz for light of a wavelength of substantially 1000 nanometers.

6 Claims, 4 Drawing Sheets

PROCESSING SOUND CAMERA

PROJECTOR

SOUND CAMERA GAIN

PROJECTOR GAIN

TUNGSTEN EMISSION vs. TEMPERATURE

PHOTOCELL OUTPUT

SOUND SYSTEM FOR COMPACT DISTRIBUTION PRINT

CROSS-REFERENCE TO RELATED CASE

This application claims the benefit of U.S. Provisional Application No. 60/004,945 filed Oct. 4, 1995.

BACKGROUND OF THE INVENTION

In present 35 mm commercial theater films, the film frames are spaced center-to-center by 4 perforations (0.748 inch) and the film frames are stepped at 24 frames per second past the film gate of a theater projector, resulting in an average film speed of substantially 90 feet per minute. The film moves at the same speed past the sound head, where a thin slit of light passes through the soundtrack and is detected by a photocell. The output of the photocell is amplified and equalized, and used to drive the loud speaker system of a theater. It is generally accepted in the industry, that the sound should be faithfully reproduced at a frequency of up to 12.5 kHz (or 13 kHz).

In a new film format, described in U.S. Pat. No. 5,534,954, the film frames are spaced at 2.5 perforations (0.468 inch), which results in saving 37.5% of the film stock previously used. It is estimated that this would save over $100 million dollars per year in film stock cost for the motion picture industry. However, the film moves only ⅝ths or 62.5% as fast, or at substantially 56 feet per minute. This new film format has been referred to as CDP for Compact Distribution Print.

There has been concern in the industry that a film speed less than the present speed of 90 fpm, would result in degradation of higher frequency sounds reproduced from the soundtrack.

The concern of the industry was stated in an article in the prestigious Journal of the SMPTE (Society of Motion Picture and Television Engineers) in its December, 1988 issue. That article described problems that would be encountered if the industry went from 4 perforations (90 fpm) to 3 perforations (68 fpm). The article stated that the frequency response would be reduced by 25%, and that with standard equalization, the bandwidth would be reduced from 13 kHz to 6 kHz, and with increased amplification at higher frequency resulting in a noise penalty. It was stated that this (68 fpm) would result in a significant reduction in audio quality. The use of an even lower speed of 56 fps for the CDP, would presumably result in a further reduction in audio quality, which would prevent the acceptance of such a low film speed in commercial motion picture theaters. A sound system which used the conventional variable width film soundtrack, so current theater projector sound systems could be used with minimum changes, which faithfully reproduced sound at up to 12.5 kHz at minimal additional cost, would enable the widespread use of such low speed and a consequent great saving in film stock cost.

SUMMARY OF THE INVENTION

In accordance with one embodiment of the present invention, a system is provided which enables the reproduction of sound represented by a variable width film soundtrack, where the reproduction is "flat" up to 12.5 kHz with minimal phase incoherence and maximum signal-to-noise ratio, despite a film speed that is much lower than the present speed. In a motion picture theater projector, a slit image is sharply focused on the film track, and light passing through the film track is detected by a photocell. The photocell, or light cell, is selected so its response is substantially flat for light at a frequency (substantially 1000 nanometers) where the output of a commonly operated tungsten lamp is of greatest amplitude. The output of the photocell is amplified so the amplification is progressively greater at progressively higher frequencies, with the amplification, or gain, at 12.5 kHz being at least 6 dB greater than at 1 kHz.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
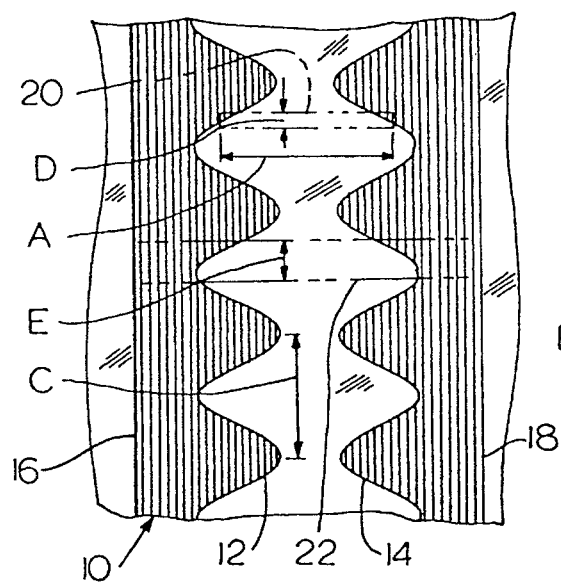
FIG. 1 is a front elevation view of a portion of a film strip soundtrack of the prior art, intended to be moved at substantially 90 feet per minute, and containing a pure tone of a frequency of 10 kHz.

FIG. 1 shows the film soundtrack 10 of a prior art piece of 35 mm motion picture film, which is intended to move at substantially 90 feet per minute past a sound head, the soundtrack portion shown representing a 10 KHz tone. The recording of the soundtrack is transparent between its opposite sides 12, 14, with the distance between them at any point along the film, representing the instantaneous amplitude of sound to be reproduced. The opposite sides 12, 14 of the recording must lie within the opposite edges 16, 18 of the soundtrack to avoid "clipping", with the area between each side such as 12 and the corresponding edge 16 being opaque. A slit of light 20 is used in a sound camera for recording, the slit being modulated in width by the sound, by means of a dual ribbon light valve which constantly controls the width A of the slit. In a projector, a slit of light 22 extending across the entire width of the soundtrack, is directed at the film. Only the transparent portion of the film illuminated by the slit of light at 22, passes through the film onto a photocell. The slit of light 20 produced by the processing sound camera (in a laboratory-like setting) has a thickness or height D that is nominally 0.2 mil (one mil equals one-thousandth inch), while the slit of light 22 produced by a projector for play back of the soundtrack has a height E that is nominally 0.5 mil (it is usually somewhat higher). The prior sound systems can record and playback sound at up to about 12.5 kHz, with the ultimate output being "flat" (the ratio of sound on the tape recorder 50 which supplies sound to be recorded on the film, to the sound produced by theater loudspeakers, is the same for all frequencies from about 50 kHz to 12.5 kHz), with substantial phase coherence.

Figure 2:
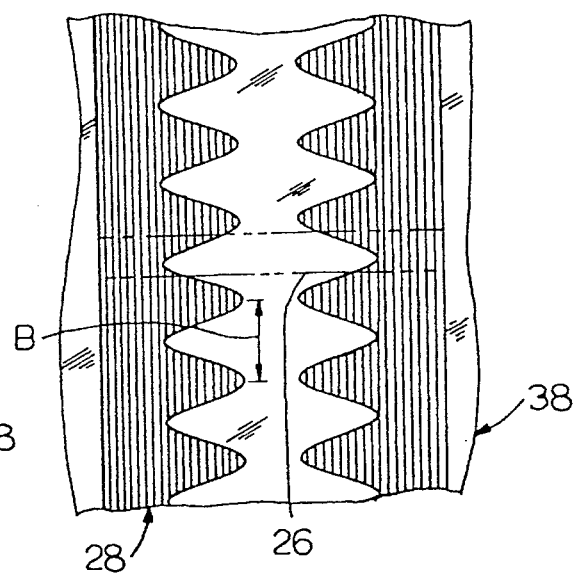
FIG. 2 is a view of a film strip similar to that of FIG. 1, containing a tone of a frequency of 10 kHz, but wherein the film is intended to be moved at a speed of substantially 56 feet per minute.

FIG. 2 shows a portion of a CDP (compact distribution print) film sound track 28, which is intended to move at substantially 56 fpm, with the soundtrack 28 representing the same high frequency tone of 10 kHz as in FIG. 1. It can be seen that the height B of one wavelength of the sound is only about 62% that of the height C for the same frequency in the prior art (90 fpm) film. If the slit heights for recording and playback had to be the same for the slow (56 fpm) film of FIG. 2 as the prior film (90 fpm) of FIG. 1, then it was feared that higher frequency sound could not be recorded and played back. It was thought that the height of the light slit images such as the height E of the projector slit, would have to be reduced to about ⅝th current height. For current projectors the slit height E is nominally about 0.5 mil (actually 0.47 mil), and further reducing the height and consistently maintaining it might be difficult and expensive for ordinary theater projectors, where checking and realignment may occur at intervals of more than one year. Also, since less light passes through a thinner slit, it was thought that more preamplification and consequent noise would result.

Applicant's analysis of current sound camera systems (90 fpm with 0.2 mil slit images) shows that they can record frequencies up to at least 20 kHz under near-ideal conditions (sharp minimum slit image height and high resolution developing), except for limitations of the dual ribbon light valve. A 15 to 16 kHz low pass filter is used in current systems to prevent second harmonic vibrations of the ribbons that modulate slit width. We find that the prior art camera slit (which we find could record at more than 20 kHz at 90 fpm) can record at least 12.5 kHz at the new speed (56 fpm) under near-ideal conditions.

One problem resulting from the lower speed (56 fpm) is that there is a progressively larger decrease in recorded amplitude with frequency, at frequencies much above 1 kHz. Applicant compensates for this by progressively greater amplification at higher frequencies. This amplification is used both at the camera and projector. The result is a "flatter" response up to 12.5 kHz. Thus, substantially the same high quality sound is recorded on the film, using the same slit imaging system as in the prior art (although technicians take care that thin slit height is maintained). Since sound recording occurs under laboratory-like conditions with skilled technicians available, and since applicant found that present equipment and film can result in the film soundtrack carrying at least 12.5 kHz sound at 56 fpm, the only question was reproduction by theater projection.

Figure 3:
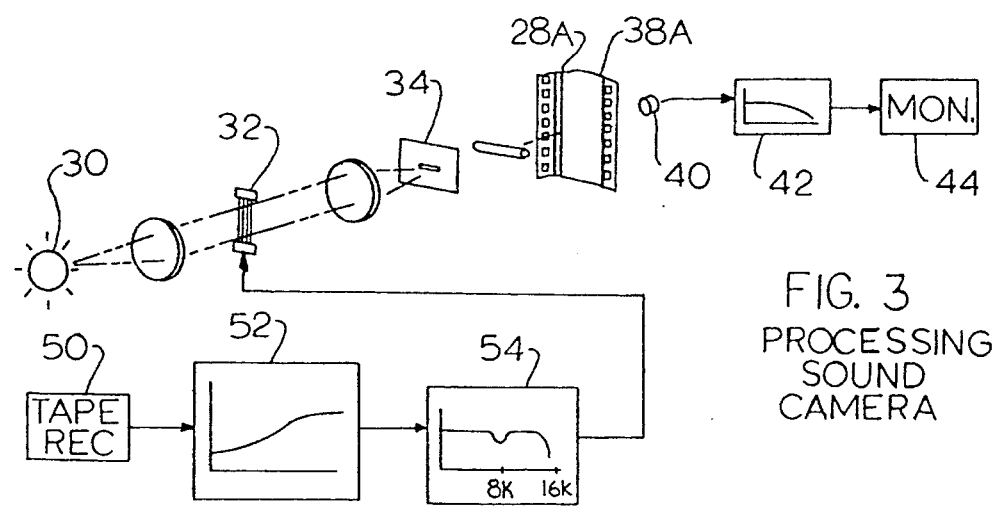
FIG. 3 is a simplified isometric and schematic diagram of a processing sound camera, which is used to produce the soundtrack of film in accordance with the present invention.

FIG. 3 shows a processing sound camera, which is used to produce an intermediate sound print, from which numerous distribution prints are made. Light from a source 30 passes through a dual ribbon light valve 32 that modulates the width of the beam. The light passes through a slit 34 whose image is focused on the soundtrack 28A of film 38A advancing at 2.5 perforations (0.468 inch) per ¹⁄₂₄th second (i.e. 56 fpm). Only one soundtrack 28A is indicated, although film usually carries two soundtracks for a stereo sound. It is noted that light passing through the film soundtrack is detected by a photocell 40, and passed through a filter 42 that is intended to mimic processing and low speed losses, to a monitor 44 (e.g. audio monitor). A technician may listen to the audio monitor when a piece of test film is passed through the camera, to check that the camera is properly recording. Electrical signals for driving the light valve 32 are obtained from a tape recorder 50 or other source (e.g. compact disk or computer) where voice, music, etc. have been combined. The output of the tape recorder 50 is an original sound signal which is intended to be produced by theater loudspeakers. The output of the tape recorder passes through an amplifier/equalizer 52, which includes amplifying and filtering circuitry, whose gain vs. frequency profile is adjusted to provide an increasing gain at increasing frequency, to produce a modified sound signal. The output of the amplifier/equalizer 52 passes through a light valve protecting filter 54. Filter 54 reduces the passage of signals near 8 kHz to compensate for the moderately damped harmonic resonance of the ribbons of the light valve 32 at that frequency. Filter 54 is also a low pass filter that blocks frequencies beginning at about 12.5 kHz, to prevent excitation of the light valve near its second harmonic frequency of 16 kHz, which would be very harmful.

Figure 4:
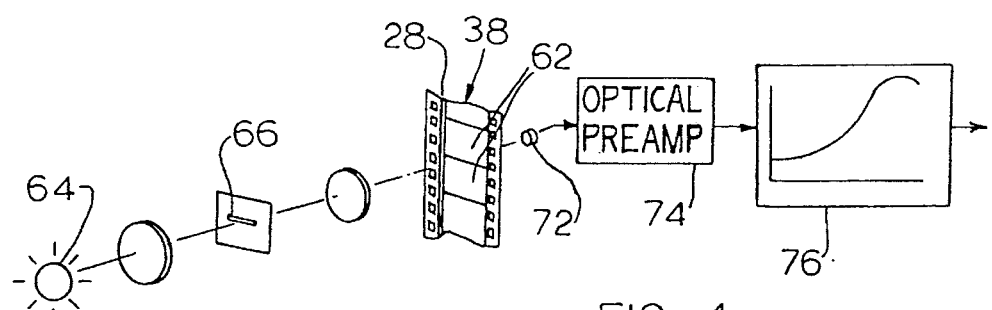
FIG. 4 is a simplified isometric and schematic diagram of a commercial motion picture theater projector of the present invention.

FIG. 4 shows a theater projector that projects film 38 having film frames 62 spaced by 2.5 periorations and moved at about 56 fpm. Light from a tungsten filament lamp 64 passes through a slit 66, with the slit image focused on the film soundtrack 28. A photo detector, or light cell 72 detects light passing through the soundtrack, and produces an output (the voltage of the cell at very low current is typically the input to the preamplifier). The output of the light cell 72 is passed through an optical preamplifier 74 and through an equalizer 76, to circuitry (unchanged from what is used for 90 fpm) that drives a theater loudspeaker system. The equalizer 76 includes amplifying and filtering circuitry, whose gain vs. frequency is adjusted to compensate for low film speed losses.

Figure 5:
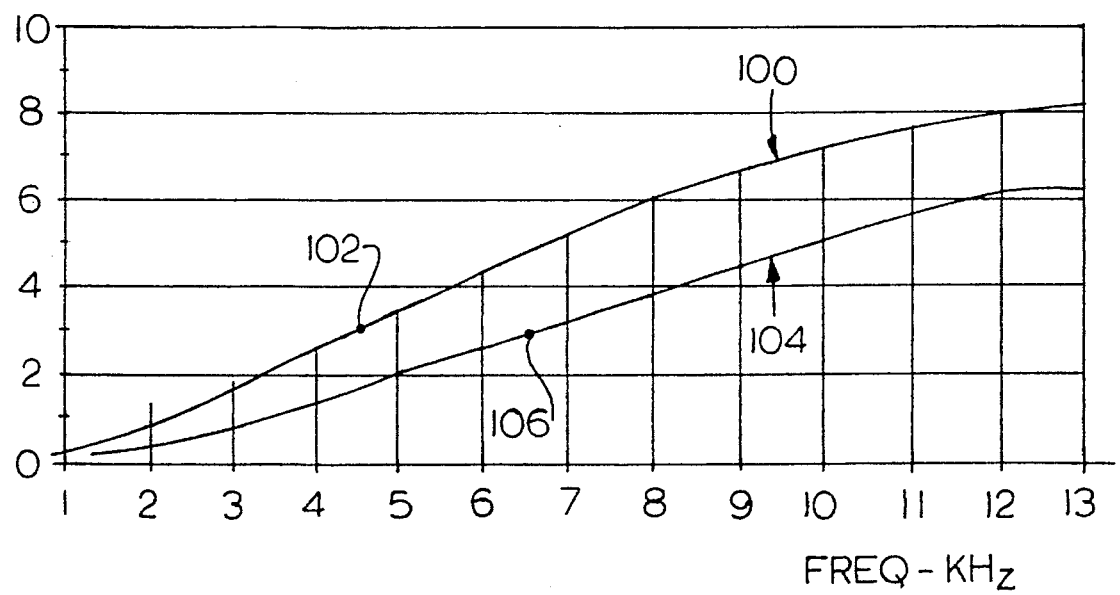
FIG. 5 is a chart for the processing sound camera of FIG. 3, showing the variation in gain with frequency for the signal delivered to the dual ribbon light valve of FIG. 3 for film recording, and comparing it to that of a prior art processing sound camera.

It is known in the prior art, that there is a falloff in recorded amplitude with frequency due to losses in processing the film, which is compensated by amplification of the signals before recording. FIG. 5 shows at 104, a prior art adjustment in sound camera gain, wherein (at 90 fpm) the amplification during recording usually began with a 3 dB gain (the breakpoint 106) which is at about 6.5 kHz, with a maximum gain of about 6 dB at 12.5 kHz. This varied, in that if the recording slit image was not sharp or the developing process decreased resolution, then more amplification might be required and it might start at lower frequencies.

Applicant, at 56 fpm, uses a well controlled soundtrack exposure (especially a sharp slit image on the film) and very high film quality processing, to achieve near-maximum resolution. Applicant also alters the gain of the sound camera as shown in FIG. 5 by line 100, so that the set point 102, or 3 dB gain occurs at 4 to 5 kHz (instead of 6 to 7 kHz), with a maximum of about 8 dB gain at 12.5 kHz. Thus, in addition to the prior gain used to compensate for film processing losses, applicant at 56 fpm adds gain to compensate for the lower speed of the soundtrack. During recording, applicant is limited in the gain that can be applied, because a substantially larger gain may cause a soundtrack modulation that exceeds the width of the soundtrack (between opposite edges 16, 18 in FIG. 1).

Figure 6:
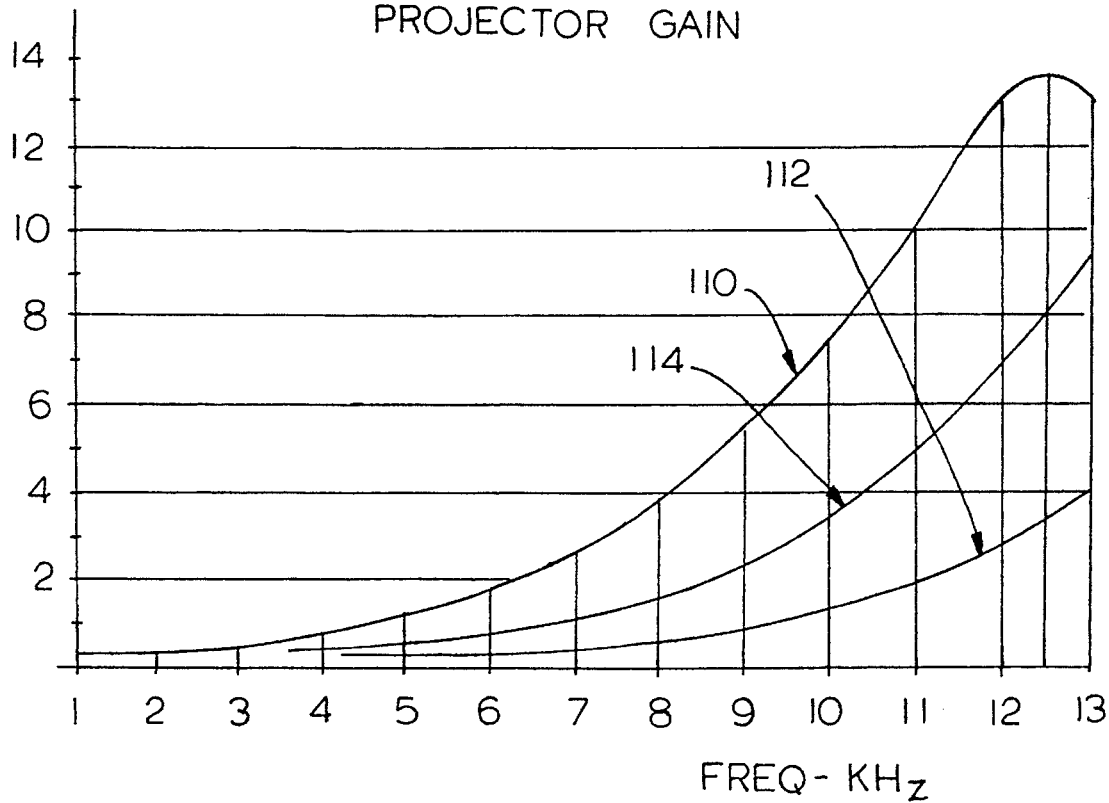
FIG. 6 is a chart showing variation in gain with frequency for the processing circuitry of the projector of FIG. 4, and also showing the variation for a projector of the prior art.

FIG. 6 shows the variation in projector gain with frequency (for a 0.47 mil sharp slit image), with line 112 representing gain for a projector operated at the prior speed of 90 fpm, and with line 110 representing gain for applicant's projector that is operated at 56 fpm. It can be seen that applicant's gain during projection is high, such as 14 dB at 12.5 kHz. A high gain during projection is feasible (unlike during recording), although noise is also amplified. The gain below 1 kHz is about 0 db (down to about 50 kHz). The gain at lower and mid frequencies such as up to 8 kHz is moderate (no more than 4 dB above that at 1 kHz), even for 56 fpm, since the losses due to lower speed are small at these frequencies and are largely compensated for by the camera amplifier gain (graph line 100 of FIG. 5). However, the gains for line 110 in FIG. 6, are much higher for frequencies above 8 kHz, with the maximum gain being 14 dB at about 12.5 kHz. The comparison of the low speed (56 fpm) graph line 110 with the prior high speed (90 fpm) graph line 112, shows that the variation in gain with frequency is much greater for the lower speed. The gain at 12.5 kHz is at least 6 dB greater at 12.5 kHz than for the prior art (90 fpm) film speed, and is usually about 8 to 10 dB greater.

Figure 8:
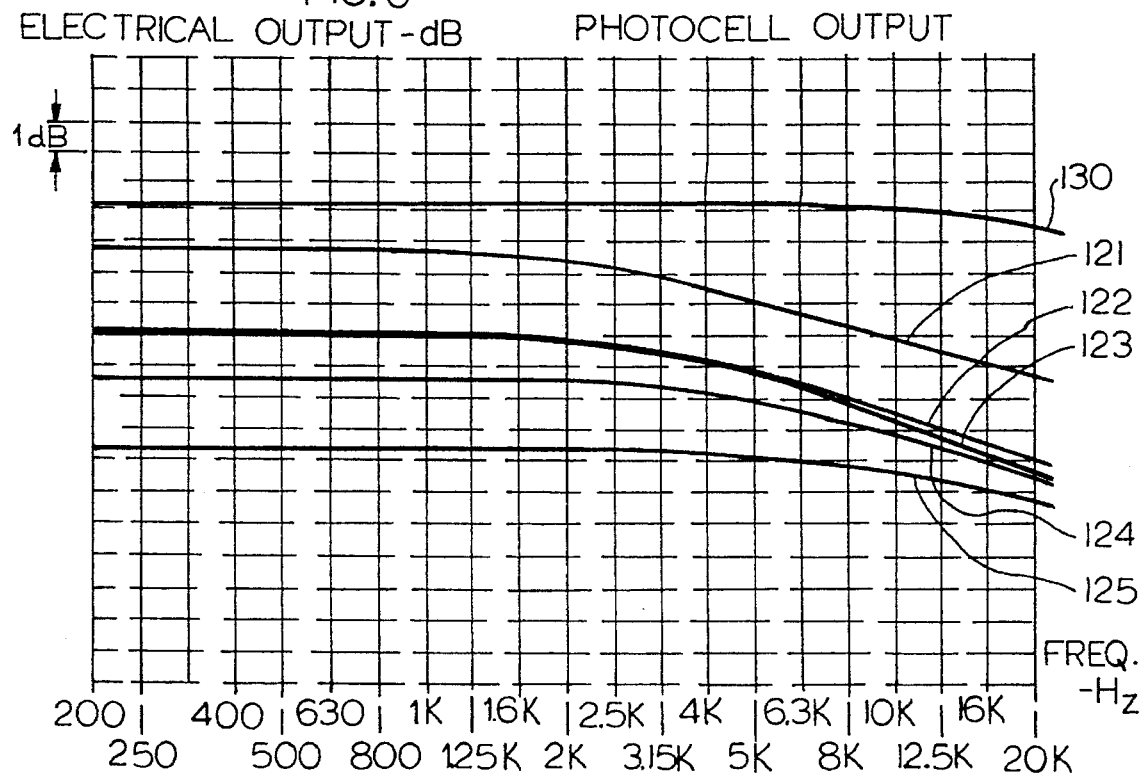
FIG. 8 is a chart showing variation in electrical output with frequency for photocells, for photocells used in theater projectors of the present invention and for those used in the prior art.

Because of the need for maximum high frequency response at 56 fpm, applicant began a program of testing the response of projector light cells (72 in FIG. 3) of many projectors in use. Applicant found that almost all have a "non-flat" response for the tungsten filament lamps used to illuminate the soundtrack. FIG. 8 shows the variation in electrical output in decibels, with frequency, for various light cells actually used for commercial motion picture theater projectors. Graphs 121–125 shows the response of five actual cells tested by applicant, when illuminated by light from a diode, emitting light of a wavelength of 940 nm, with the tests later confirmed by incandescent light. It can be seen that the "flattest" cell 125 had a drop off of about 1 dB between 1 kHz and 12.5 kHz. This cell was unusual, and applicant was not able to find any other cells with such moderate flatness. However, even this cell had an important disadvantage in that its output was relatively low, being about 6 dB below the output of the highest-output prior light cell 121 at 1 kHz. The other cells 122–124, which are typical of all cells tested by applicant, all have a large deviation from "flatness" and only a moderate output even at low frequencies. It is noted that the output of the flattest cell 125 would have been only marginally satisfactory, because of the need for much higher amplification, resulting in amplification of noise and in the higher cost for additional amplification circuitry.

Figure 7:
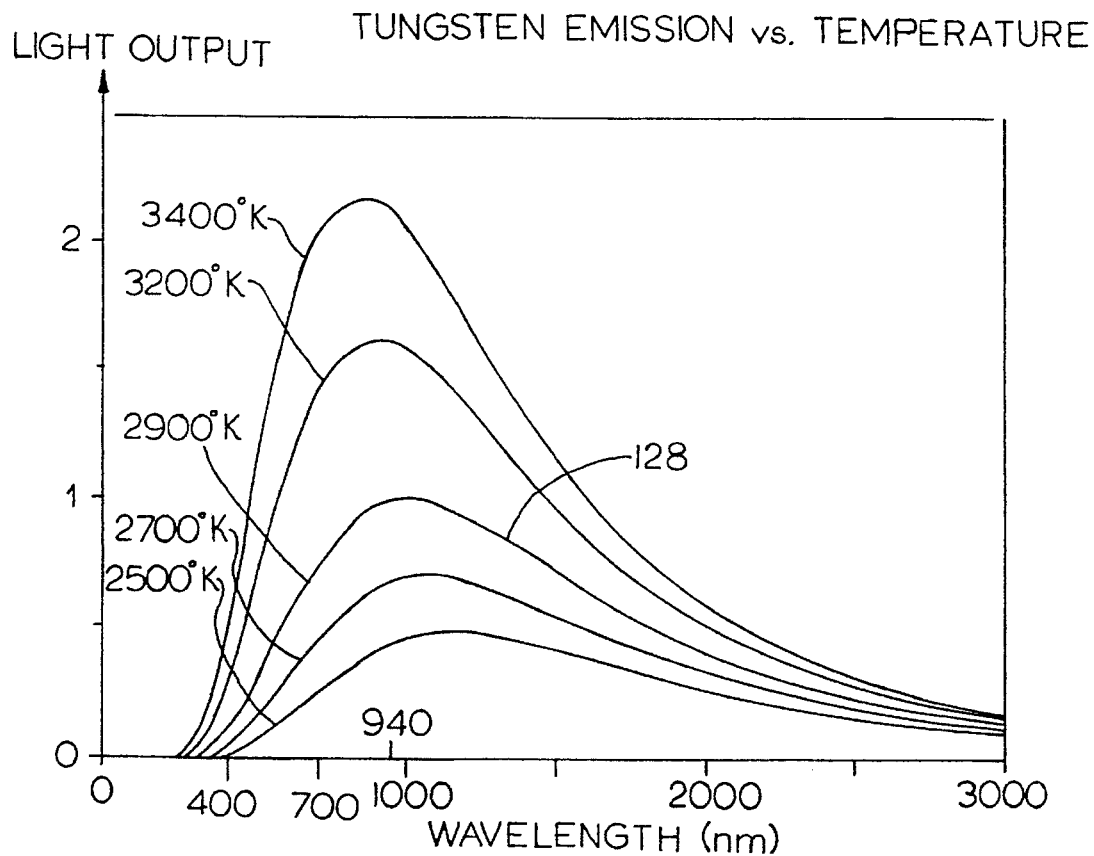
FIG. 7 is a chart showing variation in light output with frequency, for tungsten filament incandescent lamps of the type most commonly used in motion picture theater projectors, including S curves each showing the light output for a different filament temperature.

Applicant at first approached light cell manufacturers with the results of its tests. The light cell manufacturers at first denied that their cells had such a non-flat response. Upon further investigation, applicant found that the light cell supplier tested its light cells with visible red light, instead of the primarily infrared frequencies emitted by tungsten filament lamps used in projectors. FIG. 7 is a graph showing the amplitude of light output of tungsten filament lamps (used in projectors) with wavelength. Such tungsten filament lamps are usually energized so they glow as indicated by graph 128, at a filament temperature of 2900° K. It is noted that the greatest output is at about 1000 nm (nanometers) with the output actually being greatest at 990 nm, and with the average amplitude being at a wavelength of only slightly more than 1000 nm. It is also noted that the range of wavelengths for visible light is about 400 to 700 nm, which is considerably below the maximum and average output of the lamp.

Applicant has worked with a light cell manufacturer, who found that a flat response up to 12.5 kHz at 1000 nm, could be obtained by using thinner and higher resistivity silicon in the light cells. FIG. 8 shows, at 130, the output of a typical one of such newer light cells. It is noted that the output is very flat up to 12 kHz, and the magnitude of the output at any frequency is much greater than even the best one 121 of the prior art. Specifically, the cell 130 is "flat" with a variation in output of less than about 1 dB, and actually less than 0.5 dB between 20 Hz and 12.5 kHz.

Figure 10:
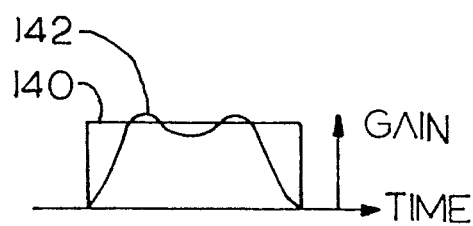
FIG. 10 shows variation in amplitude with time, of an original signal having a very rapid rise and fall, and of a reproduction of that signal where the reproduction has significant phase incoherence.

Although the output of a low output but flat response photocell can be compensated for by increased amplification, though at a higher cost and with increased noise, this is not true for a photocell with a non-flat output. Compensating for non-flatness of the photocell output by increasing gain with frequency, results in a phase shift which changes the quality of the sound that is heard. FIG. 10 shows a variation of amplitude with time for a sound pulse of fast rise time and fast fall time. Such sounds may occur when a gun is fired or a door is slammed, with even a piano or drum sound having a fast rise. Graph line 140 represents the actual pulse, while line 142 represents the results of a non-flat response, with the non-flatness compensated by an increase in gain with frequency. The phase shift cannot be compensated as a practical matter. It can be seen that the resulting curve of amplitude vs. time has been changed, and the sound from the loud speaker will be different than it should be. It is especially for this reason (in addition to cost for extra preamplification and additional noise resulting therefrom) that a photocell with a flat response up to 12.5 kHz is especially desirable (especially if it has a high output).

Figure 9:
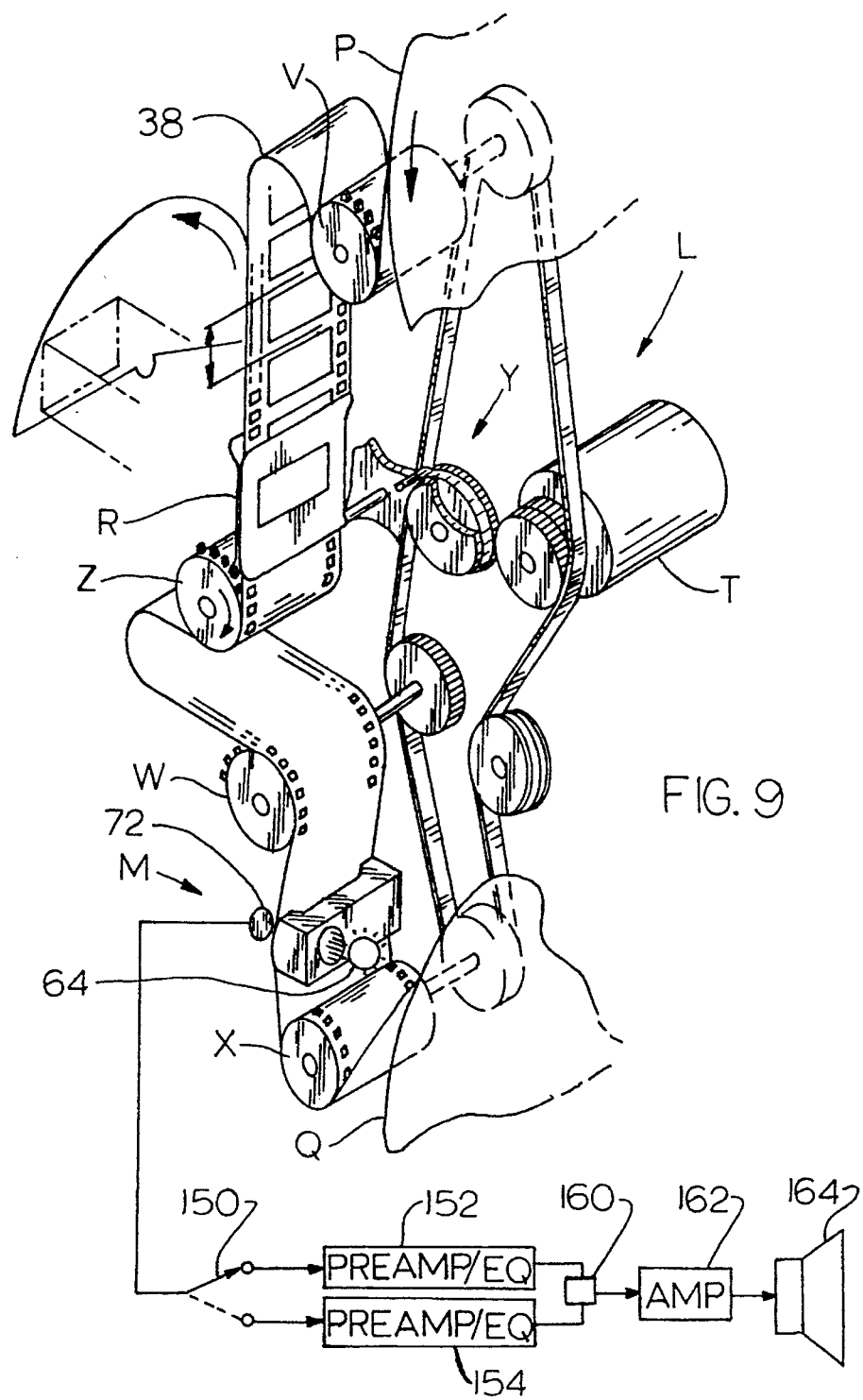
FIG. 9 is a simplified isometric and schematic diagram of another motion picture theater projector of the present invention.

FIG. 9 is a simplified view of a motion picture theater projector L, wherein the film 38 moves along a film path between a supply reel P and a takeup reel Q (although platter systems are often used). The film passes around a first sprocket wheel V, past a film gate R, and around three other sprocket wheels Z, W, X, and past a sound head M, before reaching the takeup reel. A motor T is connected by a timing belt to the various sprocket wheels to turn them all at a predetermined constant speed such as 56 fpm, except for a pulldown sprocket wheel Z. The pulldown sprocket wheel Z is shown being driven through a Geneva mechanism Y which advances the film in steps such as 0.468 inch, every 24th of a second, for an average speed of about 56 fpm. At the sound head M, the film moves at a constant speed equal to the average speed through the film gate. At the sound head, light from the lamp 64 passes through lenses and a slit, as shown in FIG. 4, to the light cell 72. The output of the light cell passes through a switch 150 (which may be electronic) to either one of two preamplifier/equalizer circuits 152, 154, and from there through a switch 160 and through an amplifier 162, to a theater loudspeaker system 164. During a time of a transition between use of present film (4 perforation spacing and projection at 90 fpm) and the CDP film (2.5 perforations and 56 fpm) the second circuit 154 is required, which produces a gain of the type shown at 112 in FIG. 6. The switches 150, 160 permit changeover between the two formats (4 perforations film frame spacing and 2.5 perforations spacing).

Applicant has actually constructed, tested, and demonstrated to potential licensees, the sound system described above which reproduces sound from film moving at 56 fpm. The demonstrations showed that high quality sound, which is basically sound of up to 12.5 kHz which sounds the same at 56 fpm as at 90 fpm to expert observers, could be obtained using prior art (modified) projectors. It is noted that applicant adjusted all of the projectors on which the various demonstrations were given, to assure that the light slit images were in focus at the film plane, and had a height of no more than 0.5 mil thereat. This was accomplished by a screw-and-nut device temporarily clamped to the slit lens housing and to the projector frame, with the screw turned to advance the slit lens housing with great control toward and away from the film, and great control in the rotational orientation of the slit image. The slit lens housing was adjusted until the light cell output was a maximum when a test film was run through the projector (with a high frequency on the sound track). Then the slit imaging lens housing was clamped to the projector frame, and the screw-and-nut device removed.

At 56 fpm, a 12.5 kHz tone has a wavelength on the film of 0.90 mils. The slit image on the soundtrack should be no more than about half the wavelength, or no more than about 0.45 mil, or no more than 0.5 mil. This is because when the slit image increases above a half wavelength of a frequency component on the soundtrack, the light cell output greatly decrease. Of course, at a slit image height equal to the wavelength, the light cell output is absolutely zero for that frequency component. Applicant consistently maintains a slit image of no more than 0.5 mil (it would be 0.47 mil in perfect focus).

In the above-referred to demonstrations, applicant used the new photocells with high and flat response and the gain shown at 110 in FIG. 6, to achieve the high fidelity sound output. Except for the above adjustments, including increasing the gain of the production sound camera and the gain of the projector amplifier/equalizer circuitry, the same projector sound equipment was used. During a transition period (from 90 fpm to 56 fpm), additional switching and preamplifier/equalizer circuitry will be required. Thus, the transition from 90 fpm to 56 fpm, which results in saving of 37.5% of the film stock, requires only moderate alteration of the projection equipment. This is of great importance because there are about 25,000 projectors used in the United States, and obtaining high fidelity sound with a minimum cost for the conversion, is of great importance.

The type of projector slit lens assembly in current use produces a slit image height of 0.47 mil when in precise focus. It is often referred to as a T-12 type. A new type of projector slit lens assembly referred to as the T-8 would have a slit image height of 0.32 mil in precise focus, but apparently is not yet in use. If such 0.32 mil slit image were used instead of the 0.47 mil one, then the projector gain (at a film speed of 56 fpm) would be as shown by graph line 114 of FIG. 6. The graph line 114 represents line 110 shifted to the right by about 2 kHz. It can be seen that for line 114, the gain would be about 8 dB at 12.5 kHz, or about 4.5 dB above the present level (for 90 fpm) for line 112. A disadvantage of the 0.32 mil slit is that much more preamplification is required, which may not be available in projectors in use, requiring the costly installation of a different preamplifier.

Although the 2.5 perforation spacing film format was developed primarily to save 37.5% of the film by running the film at the same frame rate (24 frames per second), there have been suggestions to use the opportunity of a 37.5% savings to convert the industry to a frame rate of 30 frames per second. Although a 30 fps rate would result in saving only 22% of the film currently used, it would permit higher light levels on the theater screen without a "jerky" appearance for rapidly moving objects. The use of 30 fps would result in a film speed of about 70 fpm (about 78% of 90 fpm). Since applicant has demonstrated that he can obtain high sound fidelity at only 56 fpm, it is clear that applicant can obtain high fidelity at the higher speed of 70 fpm for a 30 frame per second system. It is noted that the speed of 70 fpm is about the same as a prior suggested speed of 68 fpm where film frames spaced by 3 perforation would have been used (at 24 frames per second) instead of those spaced by 4 perforations. It is the use of a 3 perforation spacing that was stated to be unattainable in the above-mentioned SMPTE Journal article. As discussed above, applicant has attained a very good sound system at moderate cost, at the lower speed of a 2.5 perforation system.

Thus, the invention provides a sound system which produces high fidelity sound when a new film format (CDP) is used wherein the film is moved at only ⅝ or 62.5% of the speed of film in the prior art, thereby making the new film format practical. The new sound system achieves this by a moderate progressive increase in amplification with frequency by the sound camera, and by a large progressive increase in amplification with frequency for the amplifier/equalizer circuitry of the projector. In addition, a light cell is used which has a "flat" response at up to 12.5 kHz, with the flatness being within 1 dB, to achieve phase coherence so the high frequency sounds are very close to the original sounds recorded on the film. The slit image is well focused to be no more than 0.5 mil. The projector gain is at least 6 dB, preferably at least 8 dB and often (for a 0.47 mil slit) at least 10 dB at 12.5 kHz (compared to the amplification at 1 kHz), which is at least 4 dB to 6 dB more than present projectors.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A method for projecting a motion picture image contained on film of a compact distribution print format, and for creating sound represented by the varying width of a soundtrack of the film, comprising:

advancing the film in steps of about 0.47 inch each, every ¼24th to ⅟30th of a second, through a film gate to move the film at a predetermined slow average speed, and moving the film at a constant speed equal to said slow average speed, past a sound head;

focusing light of a predetermined band of wavelengths at said sound head, onto a slit-shaped area of the soundtrack portion of said film, to form a slit-shaped image on the film, and allowing light passing through the soundtrack to fall onto a light cell which creates an electrical signal of an amplitude dependent upon the amount of light falling thereon;

selecting said photocell so its response is substantially flat at said predetermined band of wavelengths;

amplifying the output of said photocell so the amplification is progressively greater at progressively higher frequencies, with the gain at 12.5 kHz being at least about 8 dB greater than at 1 kHz.

2. The method described in claim 1 wherein:

said step of selecting includes selecting a photocell whose output at 12.5 kHz is within about 0.5 dB of its output at 1 kHz for light at 1000 nanometers.

3. The method described in claim 1 wherein:

said step of advancing the film at a constant speed includes moving the film at a speed of substantially 56 feet per minute, so a tone of 12.5 kHz recorded on said soundtrack, has a wavelength height of substantially no more than 0.0009 inch;

said step of forming a slit-shaped image on the film includes forming a slit-shaped image that has a height of no more than substantially 0.0005 inch, so the height of the slit-shaped image is no more than substantially one-half wavelength of sound of 12.5 kHz.

4. The method described in claim 1 including:

recording said soundtrack including playing a recording of sound that is as intended to be produced by a theater loudspeaker to generate an original sound signal, modifying the original sound signal by introducing a recording gain that increases with frequency to produce a modified sound signal, using the modified sound signal to drive a dual ribbon light valve while directing a slit of light through the light valve, and focusing the slit of light onto a soundtrack area of a film while moving the film at said slow average speed;

said step of introducing a recording gain includes introducing a gain that is at least about 8 dB more at 12.5 kHz than at 1 kHz.

5. Apparatus for projecting a motion picture image contained on compact distribution print format film and for creating sound represented by the varying width of a soundtrack on said film, which includes moving means for moving said film at a predetermined average speed of no more than substantially 70 feet per minute along a film path so each half wavelength of sound recorded on said film track has a length of no more than 0.00056 inch for sound of a frequency of 12.5 kHz, said moving means including means for stepping the film past a film gate and means for moving the film past a sound head location at a constant speed equal to said predetermined average speed, and which also includes means for directing light from a first side of said film onto a slit-shaped area on said soundtrack of said film at said sound head location and means for detecting light that has passed through said sound head location to an opposite second side of said film and for generating and amplifying an electrical signal representing the amplitude of detected light wherein:

said means for detecting light and for generating and amplifying an electrical signal, includes a photocell whose electrical output as a function of the amplitude of light thereon, is substantially flat, within substantially 1 dB, between 1 kHz and 12.5 kHz for light of a wavelength of 1000 nanometers;

said means for detecting light and for generating and amplifying an electrical signal comprises a first amplifier circuit constructed to produce a progressively greater amplification at higher frequencies for frequencies between 1 kHz and 12.5 kHz with an amplification at 12.5 kHz which is more than 6 dB greater than at 1 kHz.

6. The apparatus described in claim 5 including a loudspeaker arrangement and including apparatus for switching said apparatus to cause said moving means to move film alternately at an average speed of 90 fpm (feet per minute), or 56 fpm, wherein:

said means for detecting light and generating and amplifying an electrical signal includes a photocell, first and second amplifier/equalizer circuits for selectively driving said loud speaker arrangement, and switch means for activating a selected one of said amplifier/equalizer circuits to amplify the output of said photocell and deliver the amplified signal to said loudspeaker arrangement, so said first amplifier/equalizer circuit is activated when film is moved at 90 fpm and said second amplifier/equalizer circuit is activated when film is moved at 56 fpm;

each of said amplifier/equalizer circuits is constructed to produce a progressively greater amplification at higher frequencies for frequencies between 1 kHz and 12.5 kHz, with the amplification at 12.5 kHz being at least 4 dB greater for said second amplifier circuit than for said first amplifier circuit.

* * * * *